(12) United States Patent
Kuczera et al.

(10) Patent No.: US 7,448,952 B2
(45) Date of Patent: Nov. 11, 2008

(54) LIGHT WEIGHT LOW ANGLE FIXED CONSTANT VELOCITY JOINT AND IMPROVED PACKAGING

(75) Inventors: Ramon Kuczera, Clarkston, MI (US); Frederick J. Uchman, Clarkston, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 386 days.

(21) Appl. No.: 11/210,040

(22) Filed: Aug. 23, 2005

(65) Prior Publication Data

US 2005/0282642 A1    Dec. 22, 2005

Related U.S. Application Data

(63) Continuation-in-part of application No. 10/840,968, filed on May 6, 2004, now abandoned.

(60) Provisional application No. 60/469,479, filed on May 9, 2003.

(30) Foreign Application Priority Data

Feb. 10, 2004    (WO) ............... PCT/US2004/004160

(51) Int. Cl.
*F16D 3/224*    (2006.01)
(52) U.S. Cl. ...................................... 464/145; 464/906
(58) Field of Classification Search .................. 464/15, 464/141, 144–146, 906; 384/513, 523, 534; 29/898.061, 898.066, 898.067
See application file for complete search history.

(56) References Cited

U.S. PATENT DOCUMENTS

| | | | |
|---|---|---|---|
| 6,224,490 B1 * | 5/2001 | Iihara et al. ................. | 464/143 |
| 6,488,588 B1 * | 12/2002 | Kadota et al. ............... | 464/145 |
| 6,733,395 B2 * | 5/2004 | Thomas et al. ............. | 464/143 |
| 6,808,456 B2 * | 10/2004 | Thomas et al. ............. | 464/143 |

* cited by examiner

*Primary Examiner*—Victor MacArthur
(74) *Attorney, Agent, or Firm*—Jennier M. Brumbaugh; Mick A. Nylander (57) ABSTRACT

A constant velocity joint includes an outer race and an inner race arranged within the outer race. The joint includes a cage arranged between the outer race and inner race and a rolling element arranged between the outer race and inner race. The cage includes relatively flat portions on an outer face the cage surrounding window areas that hold the rolling elements in place.

19 Claims, 6 Drawing Sheets

LIGHT WEIGHT LOW ANGLE FIXED CONSTANT VELOCITY JOINT AND IMPROVED PACKAGING

CROSS REFERENCE TO RELATED APPLICATION

This application is a continuation-in-part application, claiming the benefit of earlier filed non-provisional application Ser. No. 10/840,968 filed on May 6, 2004, which claims priority to provisional patent application 60/469,479 filed on May 9, 2003 which are hereby incorporated by reference in their entirety.

BACKGROUND OF THE INVENTION

The present invention generally relates to constant velocity joints and more particularly relates to a light weight low angle fixed constant velocity joint having improved packaging and more efficient assembly.

Constant velocity joints (CVJ joints) are common components in automotive vehicles. Typically, constant velocity joints are used where a transmission of constant velocity rotating motion is required. The common types of constant velocity joints are plunging tripod, a fixed tripod, a plunging ball joint and a fixed ball joint. These types of joints are currently used in front wheel drive vehicles, rear wheel drive vehicles and on propeller shafts found in rear wheel drive, all wheel drive, and four wheel drive vehicles. The constant velocity joints are generally grease lubricated for life and sealed by a sealing boot when used on driveshafts or half shafts. Therefore, constant velocity joints are sealed in order to retain grease inside the joint and keep contaminates, such as dirt and water out of the joint. To achieve this protection the constant velocity joint is usually enclosed at the opened end of the outer race by a sealing boot made of a rubber, thermoplastic, or silicone type material. The opposite end of the outer race generally is enclosed by a dome or cap, known as a grease cap in the case of a disk type joint. The mono block or integral stem and race design style joint is sealed by the internal geometry of the outer race. This sealing and protection of the constant velocity joint is necessary because contamination of the inner chamber of the joint generally will cause internal damage to the joint.

A main function of the constant velocity joint is the transmission of rotational forces and torque. In the prior art constant velocity joint assemblies, a variety of bolted joint designs are used to assemble a joint to a propshaft or halfshaft within the automotive vehicle. The torque transfer generates heat by the internal friction of the joint along with other transmission inefficiencies. Generally, as the speed and torque increase the heat generation of the constant velocity joint also increases. Many of these prior art constant velocity joints are capable of operating at specific angles which can be anywhere from a few degrees all the way up to about 50 degrees. Many of these high angle constant velocity joints have a maximum angle requirement and have to meet specific durability, strength and fatigue requirements. Some of these requirements include strength and fatigue at angle, strength and fatigue in a straight ahead condition, and quasi static strength at angle. The design of the prior art joints allow for these joints to operate at such high angles based on specific designs for the outer race, inner race, cage and rolling elements of these prior art constant velocity joints. However, many of these prior art constant velocity joints that operate at high angles on wheel ends or the like generally are very complicated to design and install. Many of these prior art joints are positively retained to the stub shafts within the wheel end environment or inboard environment of a half shaft such that once the joint is put together the joint itself cannot be disassembled unless the entire half shaft assembly is removed and the fixed joint and bar shaft are damaged and/or destroyed. Furthermore, many of these prior art constant velocity joints that operate at high angles require very heavy components and very large components which increases packaging requirements and weight for these constant velocity joints. Also the complexity of installation and design of such joints increases the cost of the constant velocity joints to the manufacturers of the automotive vehicles.

Therefore, there is a need in the art for a constant velocity joint that can operate at high angles that includes a reduced mass constant velocity joint. There also is a need in the art for a constant velocity joint that reduces the packaging space needed for the constant velocity joint in the driveline of the automotive vehicle. Furthermore, there is a need in the prior art for a reduced cost and easier to install, design and produce constant velocity joints for the automotive vehicle. There also is a need for a constant velocity joint that is capable of being disassembled without disassembling the entire driveline half shaft environment.

SUMMARY OF THE INVENTION

An embodiment of a constant velocity joint that includes an outer race, an inner race, and a cage is disclosed. The inner race is arranged within the outer race. The cage is arranged between the outer race and inner race. A rolling element is arranged between the outer race and inner race and positioned by the cage therebetween. The outer face of the cage includes a relatively flat portions surrounding window areas in which the rolling element was positioned. The constant velocity joint outer race further has a reduced diameter and a reduced head length, thereby providing a reduced mass, reduced packaging space requirement and reduced cost constant velocity joint for use in a vehicle.

BRIEF DESCRIPTION OF THE DRAWINGS

The accompanying drawings illustrate various embodiments of the present apparatus and are a part of the specification. The illustrated embodiments are merely examples of the present apparatus and do not limit the scope of the disclosure.

DESCRIPTION OF THE PREFERRED EMBODIMENT

Referring to the drawings, a constant velocity joint 10, according to an embodiment of the present invention, is shown. It should be noted that all types of CVJ joints, such as plunging tripods, a fixed tripod, etc., may be used with the present invention.

Figure 1:
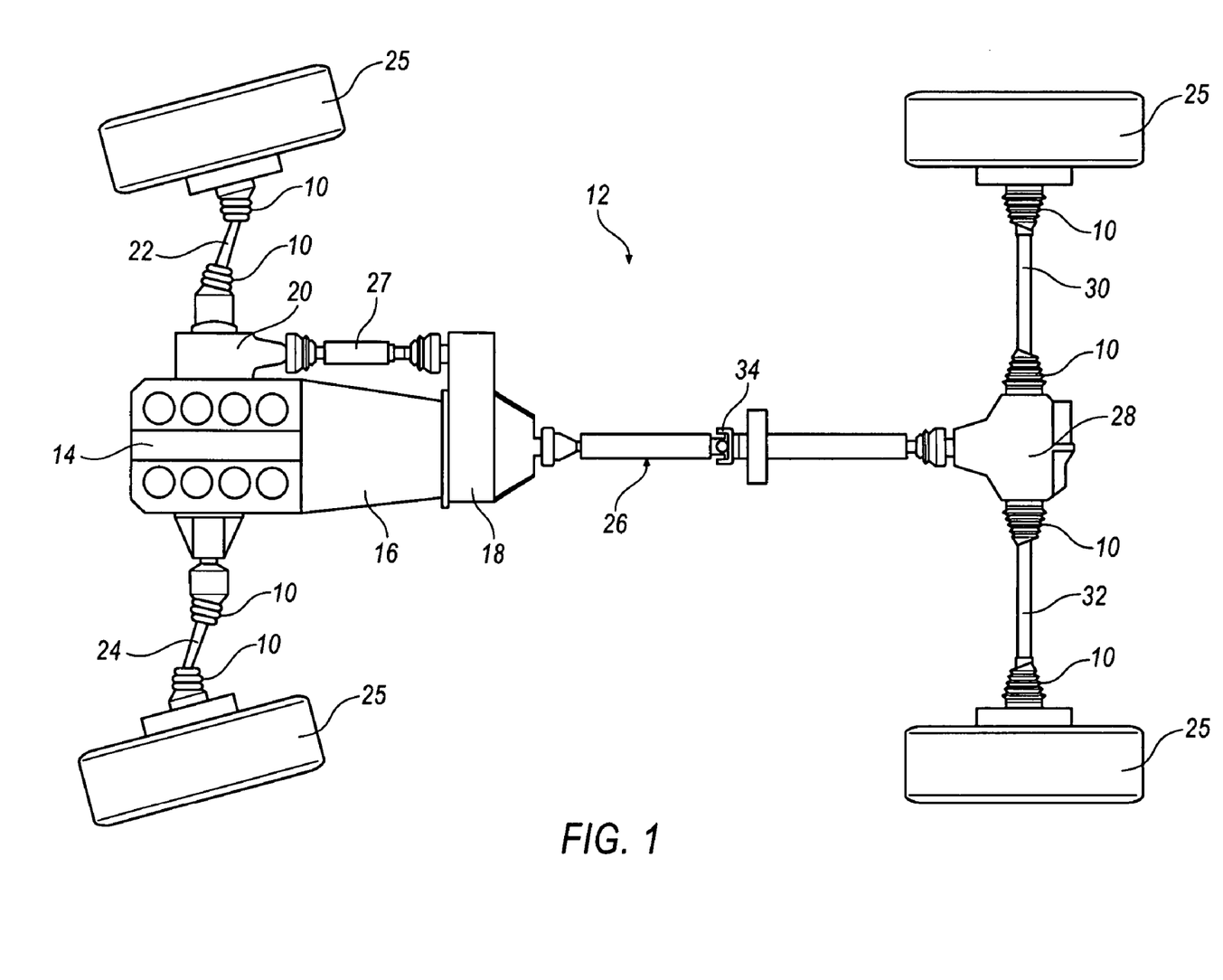
FIG. 1 is a plan view of a vehicle driveline.

FIG. 1 shows a typical driveline 12 of an automotive vehicle. The driveline 12 of FIG. 1 represents a typical all wheel drive vehicle, however it should be noted that the embodiment of the constant velocity joints 10 of the current invention can also be used in rear wheel drive vehicles, front wheel drive vehicles, all wheel drive vehicles and four wheel drive vehicles. The driveline 12 includes an engine 14 that is connected to a transmission 16 and a transfer case 18. The front differential 20 has a right hand side half shaft 22 and a left hand side half shaft 24, each of which are connected to a wheel 25 and deliver power to those wheels. On both ends of the right hand front half shaft 22 and left hand front half shaft 24 are constant velocity joints 10. A propeller shaft 27 connects the front differential 20 to the transfer case 18. A propeller shaft 26 connects the transfer case 18 to the rear differential 28, wherein the rear differential 28 includes a rear right hand side shaft 30 and a rear left hand side shaft 32, each of which ends with the wheel 25 on one end thereof. A constant velocity joint 10 is located on both ends of the half shafts that connect to the wheel 25 and the rear differential 28. The propeller shaft 26, as shown in FIG. 1, is a two piece propeller shaft that includes a Cardan joint 34 and two high speed constant velocity joints. The constant velocity joints transmit power to the wheels 25 through the driveshaft 26 even if the wheels or the shaft have changing angles due to steering and suspension jounce and rebound. The constant velocity joints 10 may be of any of the standard types known, such as plunging tripod, cross groove joint, fixed ball joint, fixed tripod joint, or double offset joints, all of which are commonly known terms in the art for different varieties of constant velocity joints. The constant velocity joints 10 allow for transmission of constant velocities at angles which are found in everyday driving of automotive vehicles in both the half shafts and prop shafts of these vehicles.

FIG. 2 through 5, and 7-9 show an embodiment of the current invention. In one embodiment, the constant velocity joint 10 is a fixed constant velocity joint which is generally used in a half shaft of a vehicle on either the wheel end or inboard transmission side of the half shaft. The constant velocity joint 10 of the present invention is typically designed to maximize the angle the joint is capable of obtaining. For example, in a front wheel drive vehicle, the fixed joint is typically the joint at the wheel 25, thus it is required that the joint have a high articulation angle to support steering of the vehicle. With this requirement, the fixed type constant velocity joint is frequently over designed in many respects for use as a rear half shaft joint where the requirement for steering is either non-existent or greatly reduced. Therefore, the present invention will allow for the design of a fixed constant velocity joint 10 for high angles that is capable of being used in either a front half shaft position or a rear half shaft position or maybe even both if design requirements dictate such. It should also be noted that any other type of CV joint may be used.

Figure 2:
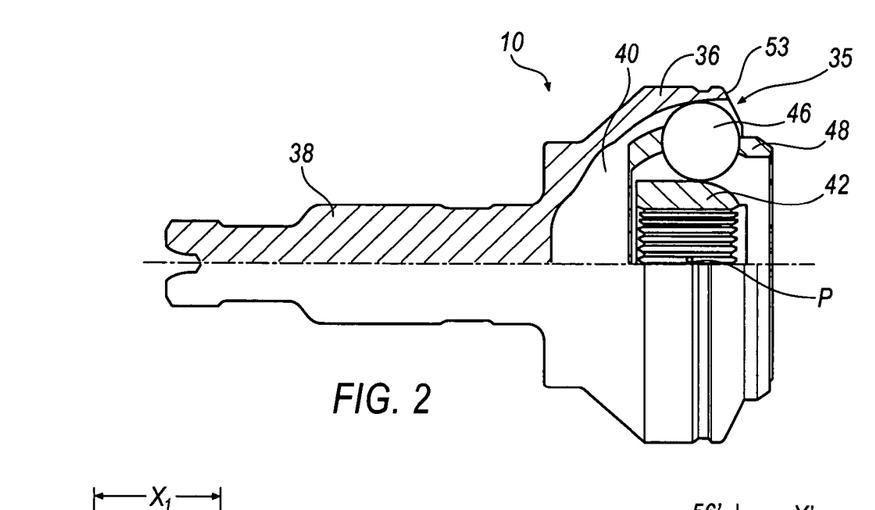
FIG. 2 is partial cross-sectional view of a constant velocity joint in accordance with an embodiment of the present invention.
Figure 4:
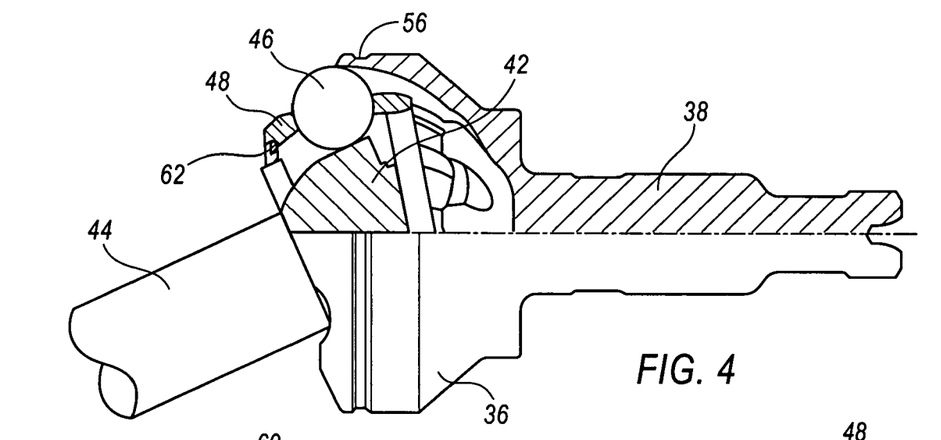
FIG. 4 is a partial cross sectional view of an embodiment the constant velocity joint of the present invention positioned at an angle.

The constant velocity joint 10 includes an outer race 36 having an open end 35 and a stem 38 attached to an opposite end thereof. In one embodiment, stem 38 is integral with outer race 36. Alternatively, stem 38 may be a separate piece and connected to the outer race 36 of the constant velocity joint 10 by any known fastening means. An inner wall of the outer race 36 generally defines a constant velocity joint chamber 40. An inner race 42 is located or arranged within the outer race 36. The inner race 42 is connected to a stub shaft 44 (as shown in FIG. 4), drive shaft, half shaft, or prop shaft of the vehicle. A plurality of rolling elements 46, balls in one specific embodiment, are arranged between an outer surface of the inner race 42 and an inner wall of the outer race 36. The balls 46 are held in position between the outer race 36 and inner race 42 surfaces by a cage 48. Each race ball 46 is located within an indentation of the outer race inner surface. The rotation of the outer race 36 will rotate the inner race 42 at the same or constant speed thus allowing for constant velocity to flow through the joint 10 between the half shaft and the wheel or transmission at an angle up to a predetermined fixed angle. The constant velocity joint 10 will allow the angle to change because the balls 46 will traverse and compensate for any difference in angle between the shafts by moving within the outer race and inner race indentations. It should be noted that the stub shaft or inter-connecting shaft 44 is secured to the inner race 42 via any known fastener and is generally positively retained to the inner race 42 after assembly of the constant velocity joint 10.

A boot cover (not shown) may be connected to an end of the outer race 36. A boot member (not shown) is arranged between the boot cover or outer race and the stub shaft 44. The boot member may be made of a urethane or any type of hard or soft plastic, rubber, fabric, etc.

Figure 3A:
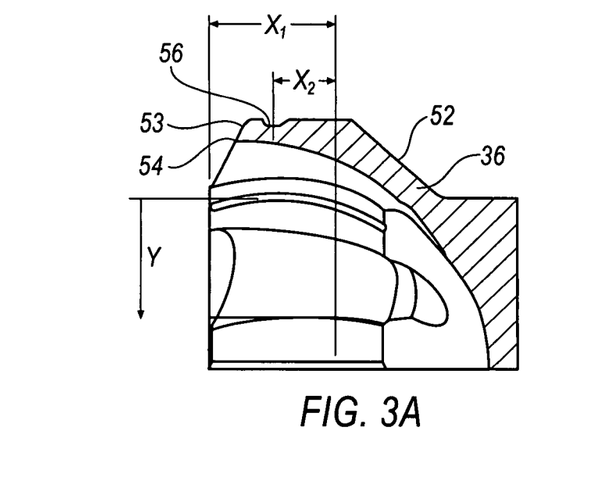
FIGS. 3A and 3B illustrate a comparison of a portion of the constant velocity joint according to the embodiment of the present invention shown in FIG. 2 (FIG. 3A) and a corresponding portion of a prior art constant velocity joint (FIG. 3B).
Figure 3B:
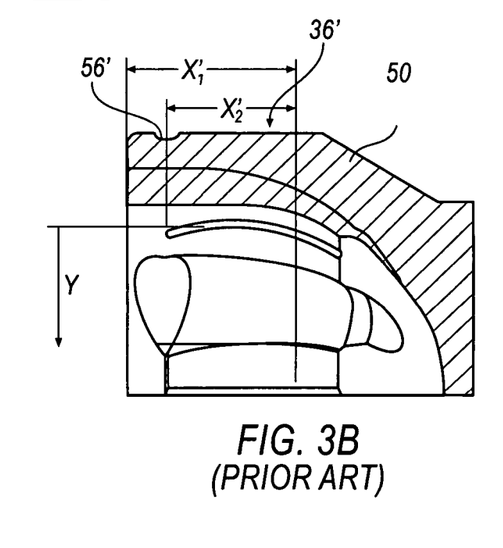

The outer race 36 of the constant velocity joint 10 will have its outer diameter optimized or maximized to allow for the constant velocity joint 10 to have a sufficient quasi static strength at angle. The outer diameter cannot be designed too small because when the joint 10 is at maximum steering angle and subjected to high torque the bell of the outer race 36 of the joint may rupture or become damaged. Therefore, the outer diameter 52 of the outer race 36 as shown in FIG. 3A has been reduced as compared to the outer race 36' of prior art joint 50 shown in FIG. 3B. According to an embodiment of the present invention, the outer race 36 includes a specific head length 54 for the constant velocity joint 10 based on the articulation angle required such that there is sufficient length in the ball tracks to support the balls 46 and the necessary clearance required to rotate the cage 48 to assemble the joint 10 and some minimum section thickness required to carry the torque through the constant velocity joint 10, but without reducing the angle of sphere wrap. Further, an end portion 53 of outer race 36 adjacent open end 35 tapers away from boot groove 56 such that the inner surface of outer race 36 extends further than the top of outer surface of outer race 36. The reduction of the outer diameter 52 and head length 54 will reduce costs of the constant velocity joint 10 and reduce the packaging space required for the component in the vehicle, but preserve support of the cage 48 without reducing sphere wrap. The reduction in costs is achieved because the inventive joint 10 requires less material, reduced grinding time, reduced forging costs, etc. The high angle constant velocity joint 10 for the present invention is one that may be used in a rear half shaft or front half shaft and operate up to a maximum angle of 25 degrees. Hence, the reduction of head length 54 and the outer diameter 52 will allow for compensation for lower stresses and quasi static strength at angle. It should be noted that the constant velocity joint 10 can be designed and optimized to operate at any specific maximum angle between 10 degrees to 50 degrees. The embodiment shown in the figures is for a joint that operates at a maximum angle of 25 degrees and preferably in a rear half shaft of an automotive vehicle. However, the same design requirements for the outer race 36 may be used for a high angle front half shaft joint such as one that operates at 50 degrees. Therefore, this design will allow for multiple joints to be designed for each vehicle thus reducing the costs of individual joints for each individual vehicle by specifically designing and then installing joints for each half shaft on either a wheel end or inboard transmission side.

In one of the embodiments shown, the constant velocity joint 10 of the present invention has a maximum articulation angle of 25 degrees and may be used as a constant velocity joint on the inboard or transmission side of the front half shafts and on both the transmission and wheel end of the rear half shafts of the vehicle driveline. The reduced diameter 52 and head length 54 as compared to the center of the constant velocity joint may be expressed as a ratio of the distance from the pivot point as compared to the pitch circle diameter. For example, referring to FIG. 3B, the ratio of the distance from the pivot point to the center of the boot groove 56' as compared to the pitch circle diameter of the prior art constant velocity joint can be expressed as $X'_2/Y'$. In one example of a prior art constant velocity joint, the value of $X'_2=11.86$ and the value of $Y'=76.05$. Accordingly, the ratio of the prior art constant velocity joint is 0.156. In contrast, referring to FIG. 3A, while the value of Y would remain the same, the value of the distance from the pivot point to the center of the boot groove 56 is significantly reduced. In an embodiment of the present invention, the value of $X_2=1.0$. Accordingly, the ratio of a specific embodiment of the invention would be 1/76.05=0.013. The reduction of the head length of the prior art, as compared to the pitch circle diameter, can also be expressed as a ratio: $X'_1/Y'$. Using the same example as above, $X'_1=22.36$. Accordingly, the ratio for the prior art constant velocity joint is 22.36/76.05 or 0.30. In contrast, in the specific example of an embodiment of the present invention, $X_1=16.0$. Thus, the ratio for the specific example of an embodiment of the present invention is 16.0/76.05 or 0.21. As can be seen, the reduction in head length 54 has been achieved while maintaining the same amount of outer race sphere wrap to support the cage 48.

With the reduced diameter 52 and head length 54 of the outer race 36, the constant velocity joint 10 will reduce the weight of the constant velocity joint 10 by approximately 30% over prior art joints. As shown in FIGS. 2 and 4, the constant velocity joint 10 also have a boot groove 56 further inboard on the outer surface of the outer race 36 of the constant velocity joint 10 closer to the pivot point P (as shown in FIG. 2) of the constant velocity joint 10. Moving the boot groove 56 to such a position will improve the durability of the boot, thereby increasing the overall durability of the constant velocity joint 10 over prior art joints by allowing for a higher sealability of the boot and thus the constant velocity joint 10 during operation.

Figure 5A:
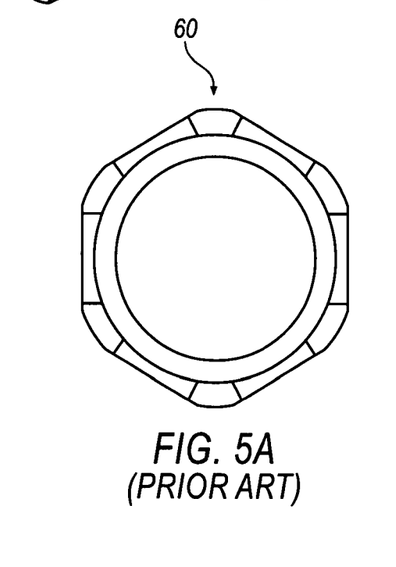
FIGS. 5A and 5B illustrate a comparison between a prior art constant velocity joint cage (FIG. 5A) and a cage for the constant velocity joint of an embodiment of the present invention (FIG. 5B).
Figure 5B:
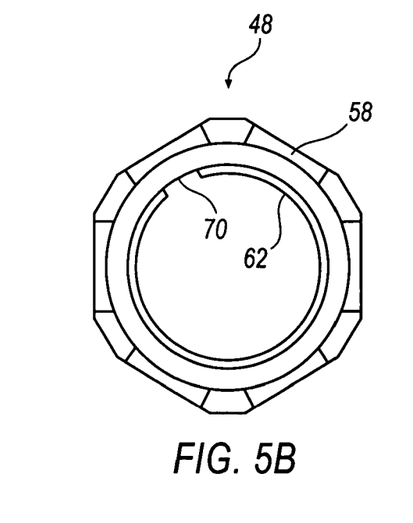
Figure 6A:
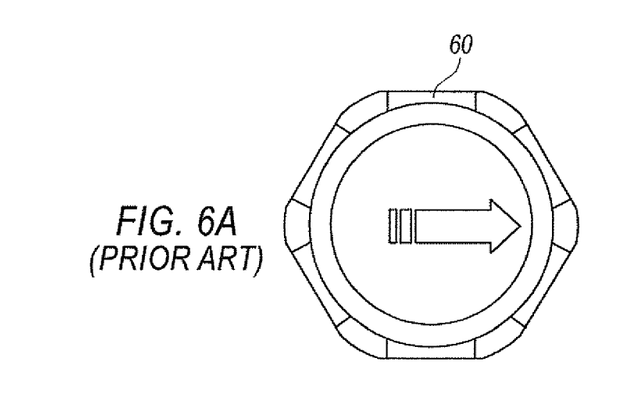
FIGS. 6A and 6B shows the constant velocity joint (FIG. 6B) of FIG. 2 in partial cross section with a prior art cage (FIG. 6A) prior to assembly therein.
Figure 6B:
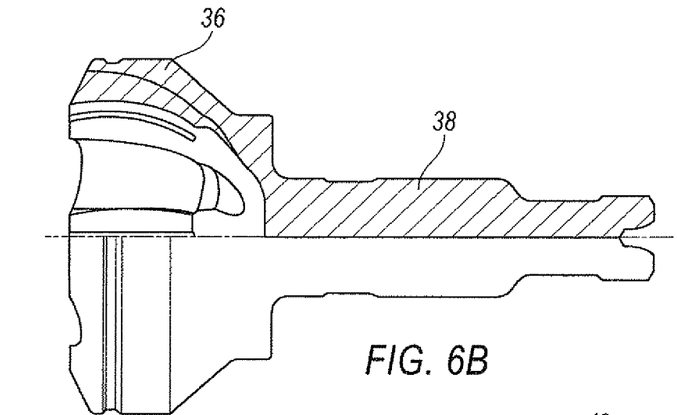

FIGS. 5A and 5B illustrate a comparison of the improved cage 48 (FIG. 5B) used in an embodiment of the present invention and a prior art cage 60 (FIG. 5A) used in a prior art constant velocity joint such as that shown in FIG. 6. The improved cage 48 for the present constant velocity joint 10 requires less material removal from the window area 58. This allows for a reduced thickness of the window area 58 of the constant velocity joint cage 48. With the articulation requirement dramatically reduced for the present invention, the cage 48 support necessary for the rolling elements 46 is reduced thus allowing for a thinner cage 48 or a cage 48 that reduces the thickness of the window area 58 and thus the amount of material to be removed to create the plurality of windows in the surface of the cage 48. Generally, the window punch thickness area has been reduced by approximately 22% over that of prior art cages. However, it should be noted that more or less material may be added thus either reducing the window thickness or increasing the window thickness by whatever the design requirements of the constant velocity joint 10 require. The reduced thickness of the constant velocity joint cage 48 will allow for improved and easier assembly of the cage 48 into the constant velocity joint 10. Generally, traditional cages 60 as shown in FIG. 6, have to be inserted into the open end 35 of the fixed constant velocity joint outer race 36 at a 90 degree orientation to an installed position and then rotated into position. Once the rolling elements are installed in the cage 60 windows the prior art constant velocity joint 10 may not be selectively disassembled.

Figure 9:
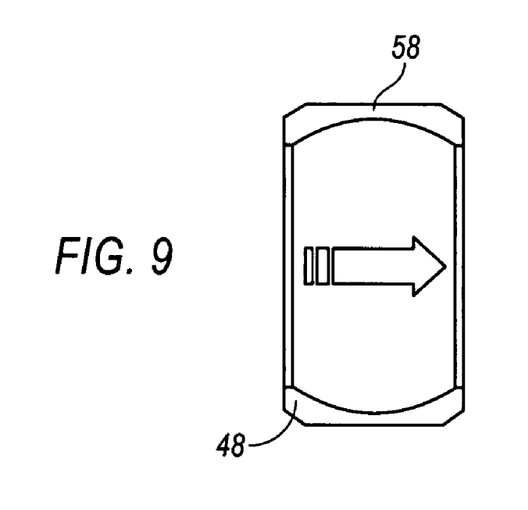
FIG. 9 shows a constant velocity joint in partial cross section with an embodiment of a cage prior to assembly therein.

In contrast, the improved cage 48 having the reduced thickness may be axially inserted directly into the mouth of the joint 10 without requiring rotation by 90 degrees as shown in FIG. 9. Thus, the complexity of the installation of the cage 48 into the constant velocity joint 10 is reduced, while allowing for the selective disassembly of the constant velocity joint 10 once it is positively retained to the shaft 44 of the vehicle driveline system.

Figure 7A:
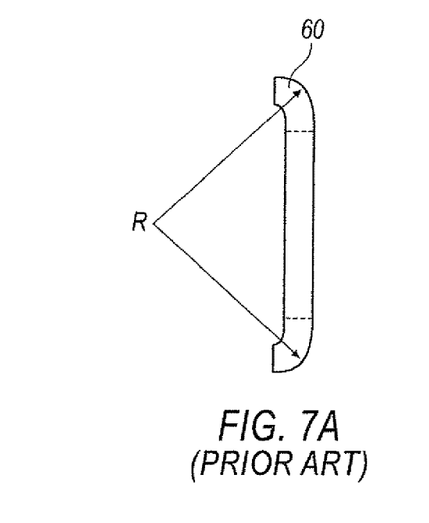
FIGS. 7A and 7B illustrate partial side views of both a prior art constant velocity joint cage (FIG. 7A) and a cage for the constant velocity joint of an embodiment of the present invention.
Figure 7B:
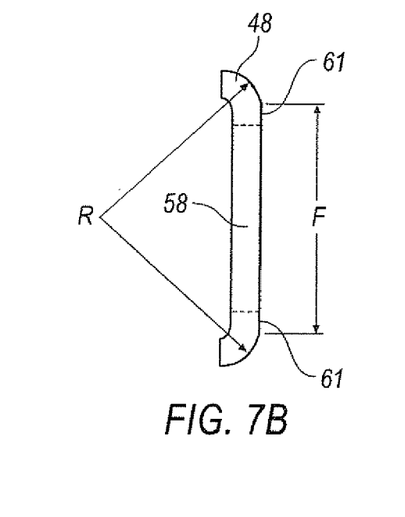
Figure 8:
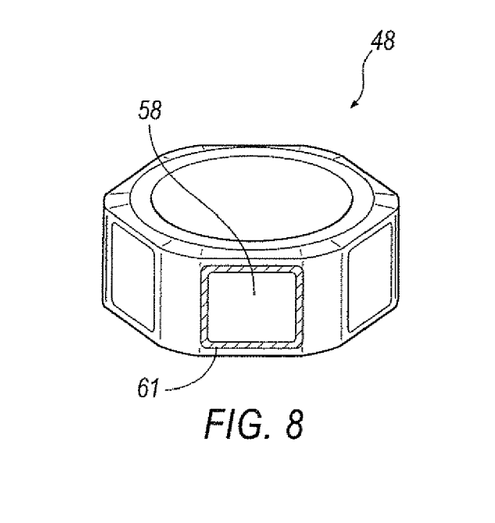
FIG. 8 is a perspective view of an embodiment of a cage for the constant velocity of the present invention.

In accordance with another embodiment of the invention, a peripheral area 61 surrounding each window area 58 is relatively flat. FIGS. 7A and 7B illustrate a comparison of partial sections of a prior art cage 60 (FIG. 7A) and an embodiment of a cage 48 (FIG. 7B) of the present invention. As can be seen in FIG. 7B, the area 61 surrounding each window area 58 is relatively flat, including across the opening, designated as F. In contrast, the prior art cage includes areas around the window (FIG. 7A) that are curved. The flat peripheral area 61 of each window area 58 of the improved cage 48 allows for the ease of assembly directly into the joint 10, as well as selective disassembly of the joint 10. It should be noted that the reduced thickness window area 58 of the improved cage 48 also will allow for the windows in the cage 48 to be punched out versus that of the thicker cages of the prior art which have the windows machined into the cage surface.

Once the cage 48 is installed within the outer race 36, the inner race 42, with the shaft 44 installed therein, may be inserted into the cage 48. Next, the rolling elements 46 may be installed into the joint 10 by selectively articulating the shaft to permit insertion of each rolling element 46.

Figure 10:
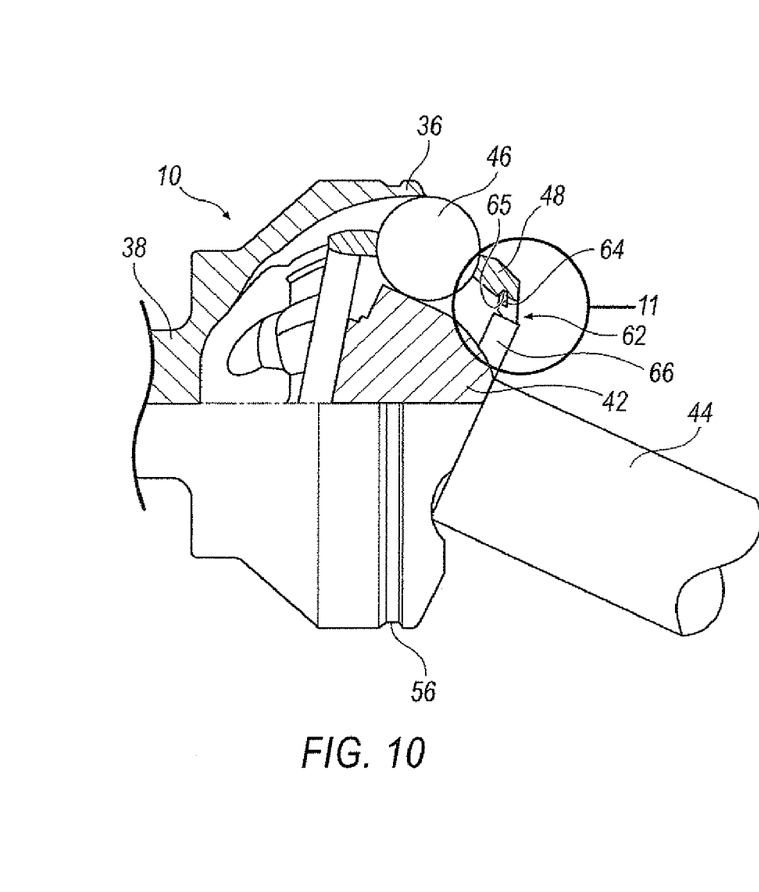
FIG. 10 is a partial cross sectional view of an embodiment of the constant velocity joint of the present invention.
Figure 11:
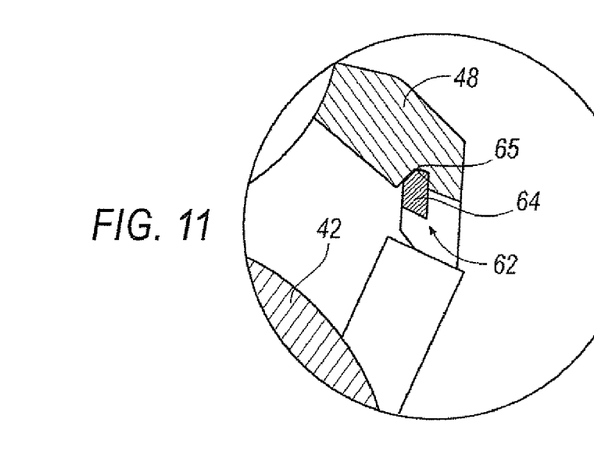
FIG. 11 is an enlarged view of a portion of the constant velocity joint of FIG. 10, illustrating an angle stopper feature.

An embodiment of the cage 48 of the present invention as shown in FIGS. 10 and 11 may also include an integrated angle stopper 62 to prevent over articulation of the constant velocity joint 10 and to retain the rolling elements 46 within the joint, after assembly into the joint 10. In many prior art designs the end of the shaft, when assembled to the joint, would protect the joint from over articulation by contacting the bell of the outer race 47 at maximum angle. In the constant velocity joint 10 of the present invention the outer race 36 has been lightened and shortened to such a degree that it will no longer prevent over articulation. Indeed, some degree of over articulation is desired in the present invention to permit selective assembly and/or disassembly of the joint 10. However, it bears noting that over articulation can result in the balls 46 not being held in the joint 10, thus possibly allowing unplanned and undesirable disassembly during handling of the joint 10. The angle stopper feature 62 as shown in FIGS. 10 and 11 generally is a retaining ring 64 arranged in a circumferential groove 65 formed on an inner surface of the cage 48. The retaining ring 64 will extend a predetermined radial distance from the inner surface of the cage 48 of the constant velocity joint 10. The retaining ring 64 may be arranged around the entire 360 degree circumference of the inner surface of the cage 48. Alternatively, a predetermined sized gap 70 may be provided within the ring 64. The predetermined sized gap 70 in one embodiment will be at least slightly larger than the width of one lobe 66 of the inner race 42. This will allow at least one lobe 66 of the inner race 42 to pass through the gap 70 of the retaining ring 64 thus allowing for the joint 10 to be articulated to a larger angle in that one position. This additional articulation angle could be useful for vehicle installation. In operation, the constant velocity joint 10 only needs to be rotated until either the specific lobe 66 is aligned with the gap 70 and then the inner race 42 can be over articulated beyond the angle stopper feature 64 thus allowing for increased articulation. It should be noted that in one contemplated embodiment only one specific lobe 66 will have a width complementary to the gap 70 thus requiring that specific lobe 66 be aligned with the gap 70 to allow for disassembly. However, in other contemplated embodiments any of the lobes of the inner race 42 may also align with the gap 70 to allow for easy disassembly. The design requirements of such a disassembly feature will vary depending on the environment the constant velocity joint 10 will be used in.

As mentioned above, in one embodiment, the angle stopper feature 62 is a retaining ring 64 that is snap-fit into an inside surface of the cage 48. However, other angle stopper features have been contemplated, such features include, but are not limited to a localized deformation of the cage 48 after the constant velocity joint 10 is assembled. Further, an angle stopper feature 62 may be a localized deformation of the outer race 36 after the constant velocity joint 10 of the present invention is assembled. However, this type of feature will prevent selective disassembly of joint 10, once assembled. Other angle stopper features 62 may also be used according to the present invention. It should be noted that in one contemplated embodiment if the joint requires service, the retainer ring 64 can be removed allowing joint disassembly, even in positive retention joints.

The constant velocity joint 10 with a predetermined distance between the outer race 36 of the fixed joint 10 and the center line of pivot has been reduced as shown above due to the improved cage assembly requirement for the constant velocity joint 10 using the improved cage 48. In operation and during assembly the constant velocity joint inner race 42 will have the stub shaft or half shaft 44 positively fixed to an orifice in the inner race 42 via any known fastening means. Then, as shown in FIG. 9, the improved cage 48 will be assembled into the outer race 36 of the constant velocity joint 10 without the need for a 90 degree rotation after assembly therein. Next, the inner race 42 (with shaft 44 connected thereto) will be placed within the inner bore of the improved cage 48. Then the rolling elements 46 will be aligned within the specific ball tracks of the outer race 36 and inner race 42 by over articulating the shaft 44, until all of the balls 46 of the constant velocity joint 10 have been inserted. It should be noted that any number of balls 46 may be used such as a six ball joint, eight ball joint, ten ball joint, twelve ball joint, or any other known number of ball joints for the present invention may be used. After the joint 10 is assembled by having the cage 48, inner race 42 and shaft 44 inserted and arranged within the outer race 36, the retaining ring 64 of the constant velocity joint cage 48 will be inserted into groove 65 for selective removal. This will allow for the joint 10 to prevent over articulation during handling and operation of the joint 10. This will allow for a positively retained shaft 44 within the constant velocity joint 10 as required by many automotive vehicle manufactures. However, the use of the retaining ring 64 with a predetermined gap 70 will also allow for easy disassembly of the constant velocity joint 10 without having to remove the entire half shaft assembly from the automotive vehicle. It should be noted that all of the parts described in the present invention are generally made of a steel material, however any other metal, hard ceramic, plastic, composite, or the like may also be used for any of these parts in the constant velocity joint of the present invention.

The present invention has been described in an illustrative manner, it is to be understood that the terminology which has been used is intended to be in the nature of words of description rather than of limitations.

Many modifications and variations of the present invention are possible in light of the above teachings. Therefore, within the scope of the appended claims, the present invention may be practiced otherwise than as specifically described.

What is claimed as new and desired to be protected by Letters Patent of the United States is:

1. A constant velocity joint, said joint including:
   an outer race having a cylindrical outer surface, an opposing inner surface and a frusto-conical end portion defined by a conical end surface that extends from said outer surface to said inner surface symmetrically about the inner surface;
   an inner race arranged within said outer race;
   a cage arranged between said outer race and said inner race;
   wherein said cage has at least one window area having a relatively flat peripheral outer face area surrounding said window area;
   a rolling element arranged within said window area such that said rolling element is positioned between said outer race and said inner race for rolling contact with said inner surface to a point where said inner surface meets said conical end surface; and
   said outer race is shaped to prevent removal of said inner race, said cage and said rolling element therefrom.

2. The constant velocity joint of claim 1 wherein said outer race has a ratio of head length as compared to pitch circle diameter of less that 0.30 while maintaining a predetermined level of support for said cage.

3. The constant velocity joint of claim 1, wherein said outer race has a ratio of distance from a center of a boot groove area to a pivot point of the constant velocity joint of less than 0.156 such that said joint may operate at a plurality of predetermined angles while maintaining a predetermined level of support for said cage.

4. The constant velocity joint of claim 3 wherein one of said predetermined angles is approximately 25 degrees for a front inboard joint or a rear joint.

5. The constant velocity joint of claim 1 wherein said cage is axially inserted directly into the joint such that said window area is facing toward either a top or bottom an inner surface of said outer race.

6. The constant velocity joint of claim 1 further including a retaining ring positioned on an inside surface of said cage, said retaining ring preventing over articulation of the joint beyond a predetermined angle.

7. The constant velocity joint of claim 6, wherein said retaining ring is positioned within a groove formed within said inside surface of said cage.

8. The constant velocity joint of claim 6 wherein said retaining ring further includes a predetermined sized gap therein.

9. The constant velocity joint of claim 8 wherein said gap is wider than a width of one lobe of said inner race.

10. The constant velocity joint of claim 9 wherein the joint includes a positively retained shaft secured to said inner race by said retaining ring.

11. A fixed constant velocity joint for use in a driveline system, said joint including:
   an outer race having a cylindrical outer surface, an opposing inner surface and a frusto-conical end portion defined by a conical end surface that extends from said outer surface to said inner surface symmetrically about the inner surface;
   an inner race arranged within said outer race;
   a cage having a window area arranged between said inner race and said outer race;
   wherein said window area further includes a relatively flat peripheral outer face area surrounding said window area;
   a rolling element arranged within said window area such that said rolling element is positioned between said outer race and said inner race for rolling contact with said inner surface to a point where said inner surface meets said conical end surface;
   a shaft engaged with said inner race, and
   said outer race is shaped to prevent removal of said inner race, said cage and said rolling element therefrom.

12. The joint of claim 11 further including a retaining ring positioned on an inside surface of said cage.

13. The constant velocity joint of claim 12, wherein said retaining ring is positioned within a groove formed within said inside surface of said cage.

14. The joint of claim 12 wherein said retaining ring further includes a gap therein.

15. The joint of claim 14 wherein said gap is wider than a width of a lobe of said inner race.

16. The joint of claim 12 wherein said shaft has positive retention within said inner race and the joint is capable of selective and non-destructive disassembly.

17. The constant velocity joint of claim 11 wherein the diameter and a head length of said outer race allows said joint to operate at a plurality of predetermined angles.

18. The constant velocity joint of claim 17 wherein one of said predetermined angles is approximately 25 degrees for a front inboard joint or a rear joint.

19. The constant velocity joint of claim 11 wherein said cage is axially inserted directly into the joint such that said window area is facing toward either a top or bottom an inner surface of said outer race.

* * * * *